2,961,292
Patented Nov. 22, 1960

2,961,292

PROCESS FOR INHIBITING ACID CLEANED COOLING SYSTEMS

Charles F. Pickett, Bel Air, and Myer Rosenfeld, Baltimore, Md., assignors to the United States of America as represented by the Secretary of the Army No Drawing. Filed Mar. 24, 1959, Ser. No. 801,673

10 Claims. (Cl. 21—2.7)

(Granted under Title 35, U.S. Code (1952), sec. 266)

The invention described herein may be manufactured and used by or for the Government for governmental purposes without the payment to us of any royalty thereon.

This invention relates to improvements in corrosion inhibiting process for acid cleaned cooling systems disclosed and claimed in our copending application Serial No. 801,672, filed of even date. This invention is particularly applicable where corrosion inhibition beyond that obtained by the process of the above noted application is required. More particularly the invention relates to compositions of a two step inhibitor, and the process of using this so as to minimize corrosion subsequent to acid type cleaning of the cooling system.

The process of using this cleaner is identical in all details with that of our copending application; however, the two step inhibitor consists of two chemicals which act synergistically to produce more effective inhibition than that obtainable in the method of the copending application.

Previous inhibitors, according to our tests, have been satisfactory in use with cooling systems that have never been exposed to acid type cleaners, provided that the chloride content of the water used in the cooling system did not exceed approximately 10 p.p.m. (10 parts chloride per million parts of water by weight). Approximately 50 percent of the country has chloride content of 10 p.p.m. or lower. However, once the cooling system has been cleaned with acid cleaners such as oxalic acid, sodium bisulphate, combinations of these, or oxalic-acid-aluminum chloride cleaners, the surface appears to become activated even at chloride content of approximately 4.5 p.p.m. About 75% of the country has water exceeding this chloride content. It may be that the process of casting engine blocks leaves a protective silicate coating on its surface, and that this protective coating is destroyed by the undermining effect of the acid cleaner. Chloride may also cause penetration below the protective coating with subsequent attack on the base metal, followed by peeling of the protective layer.

One object of this invention is to provide a two step inhibitor that will minimize the corrosion of cooling systems which have been cleaned by acid cleaners, even when such cooling systems are subsequently subjected to chloride contents as high as 612 p.p.m.

A second object of the invention is to provide a process of utilizing this two step inhibitor with water of even the highest degree of calcium and/or magnesium hardness found in the United States, in the presence or absence of sulfate and/or carbonate.

A further object of the invention is to provide a two step inhibitor that will minimize corrosion in cooling systems whether water, alcohol-water or glycol-type water-antifreeze solutions are subsequently used as coolants in the cooling system subsequent to the acid cleaning.

The inhibitor consists of two parts and is used in two steps. The first part broadly comprises a sodium silicate solution. The sodium silicate solution used is satisfactory for the purpose of this invention only if the ratio of the silica to sodium oxide by weight is not less than approximately 3 nor greater than approximately 4. Commercial water glass is an example of a satisfactory sodium silicate.

The second part of the inhibitor used in the second step of the inhibition process consists of sodium tetraborate plus hexamethylene tetramine. The water content of the sodium tetraborate used; i.e., the particular hydrate form, does not affect the efficiency of this part of the inhibitor.

One process of inhibiting the cooling system which has been cleaned by an acid cleaner and subsequently flushed with water is to first drain the cooling system, in the event the available water is other than natural soft water; i.e., in the event that the mineral content is over 30 p.p.m. For natural soft water, drainage is not necessary but does no harm. The silicate solution is next added in such quantity that the sodium silicate content when diluted to the capacity of the cooling system lies between 0.18% to 1.6% by weight of the total. The sodium silicate used is added in the form of a concentrated solution containing not over 40% by weight of sodium silicate; preferably, the concentrated silicate solution diluted with 1½ to 2 volumes of water and mixed thoroughly prior to addition to the cooling system. No harm is done if greater dilutions are made prior to this addition. Water is next added to fill the cooling system, this step being omitted for natural soft waters if drainage step was omitted. The engine is idled to circulate the water-silicate solution thoroughly. Circulation is best started when the cooling system is about half full. Satisfactory results are obtained with circulation from one-half minute to four hours. Temperatures of the cooling system from ambient to approximately 180° F. are satisfactory for this process. Best results are obtained by circulating the silicate for 15 minutes after a temperature of 160° F. to 180° F. has been attained.

For hard waters, it is essential that the silicate solution be added to the drained cooling system and the water added last. The reverse process results in precipitation of hardness, probably as silicates. The explanation may lie in the fact that the pH of water is much lower than that of the silicate. Adding the silicate to the water presumably gives a solution sufficiently low in pH to cause precipitation. Although the final pH will be the same regardless of order of addition, adding the water to the silicate gradually lowers the pH to that of the final solution without the solution ever approaching the pH of the water. Once precipitation has occurred the rate of resolution is negligible. Apparently the solution passes through something resembling an iso-electric point for the system in the silicate to water addition.

Prior to the second inhibiting step, the cooling system must be drained, then filled with the desired coolant (water, water plus alcohol, or water plus glycol type antifreeze). Borax or other sodium tetraborate is added in such quantity that the anhydrous content corresponds to not less than 0.6 gram sodium tetraborate per 100 milliliters of coolant nor more than 2.0 grams per 100 milliliters of coolant. Hexamethylene tetramine is added in from 0.04 to 0.8 gram per 100 milliliters of coolant. Best results are obtained with sodium tetraborate addition that corresponds approximately to 0.8 gram per 100 milliliters of water or 1.2 to 1.3 grams per 100 milliliters of water plus alcohol or glycol water type antifreeze systems, the sodium tetraborate in the above referring to anhydrous content, together with 0.1 gram hexamethylene tetramine per 100 milliliters coolant in the same solutions.

In all cases studied, use of the sodium silicate solution as indicated above, without subsequent use of the borax, resulted in acid-cleaned test panels (cut from an engine block) giving a surface completely corroded; i.e., no part of the surface was free of corrosion after a ten day accelerated test in the presence of copper. Sodium tetraborate plus hexamethylene tetramine used as indicated above, without previous use of the silicate, produced similar results, although the corrosion was not as thick. No visible corrosion was obtained with sodium tetraborate corresponding to anhydrous content of 0.6 to 0.8 gram per hundred milliliters of water, with 0.04 to 0.8 gram per hundred milliliters of hexamethylene tetramine after the use of sodium silicate. However, compared to borate alone used in this step, corrosion determined by removing the corrosion products by pickling, with subsequent washing and weighing, gave weight losses about ¾ to ½ as great as with sodium tetraborate used without the hexamethylene tetramine, as when the hexamethylene tetramine was present, provided the silicate rinse was used as described for step I of the inhibiting process. The hexamethylene tetramine may be added in the form of an aqueous solution, or may be added as a solid, either alone or simultaneously with the sodium tetraborate.

The explanation of this synergistic effect is believed to be as follows: In normal corrosion of the cooling system, iron is oxidized first to ferrous iron, then to ferric iron by the dissolved oxygen; copper to copper hydroxide. Any copper hydroxide in solution can oxidize iron or ferrous iron to the ferric state. The low solubility of copper hydroxide aids this reaction somewhat by changing the potential of the copper-copper hydroxide half cell in the correct direction. Any copper hydroxide causing oxidation is itself reduced to metallic copper and plates onto the iron. It can be very clearly seen on test panels studied. This copper probably forms a galvanic couple with the iron and promotes more vigorous corrosion. The corrosion rate is approximately doubled in the presence of copper when the cooling solution is kept saturated with air.

When sodium silicate is used after acid cleaning, the small quantity of acid present causes precipitation of a very thin adhesive layer of gelatinous silica (probably silica gel, heavily hydrated form). Corrosion of the iron at weak spots or spots unprotected by this layer probably spreads under the layer and causes it to peel, since the coated portion would be anodic due to lower oxygen concentration. Hence, a silicate rinse alone is not effective.

The gelatinous silica acts as a barrier to slow down migration of oxygen, hydroxyl, and also of copper ions. However, the unprotected portions or weak spots that wear away are still available to these for corrosion. In the presence of sufficient sodium tetraborate, however, insoluble iron borate can form from ferrous oxide before appreciable migration from the corrosion site occurs. This iron borate can then "patch up" the weak points in the silica gel, and being hindered from migration by the gel, can help form a physical barrier to the corroding agents. When sodium tetraborate is used without the gel, unhindered migration of the ferrous iron away from the actual anodic site of corrosion can occur prior to formation of the borate, so that protection is not obtained under adverse conditions. Apparently even this "patched up" gel still permits some corrosion to occur, as can be proved by the weighing technique. Hexamethylene tetramine when used in step II without the presence of sodium tetraborate has been found to afford no detectable protection against corrosion when used in concentrations from 0.04 gram to 0.8 gram per hundred milliliters of water. As there is increased protection when the hexamethylene tetramine is used in the presence of sodium tetraborate, there is a synergistic effect, because there would be no improvement from the hexamethylene tetramine otherwise, and it would not be predictable from the individual actions that there should be an improvement on using the combination of sodium tetraborate and hexamethylene tetramine.

The explanation of this synergistic action is believed to lie in the adsorption of hexamethylene tetramine on the cathodic areas of the metal. When insufficient area is covered so that large areas as cathodic are exposed, as happens with breakdown in the silicate coating, molecules of hexamethylene tetramine available to unit cathodic area are small compared to that when such weak spots are essentially covered by the iron tetraborate. In the latter case, one would expect more molecules traveling laterally from surrounding solution to be immediately available for adsorption than would be for inner portions of larger areas. Also rate of re-solution would be smaller for the smaller areas, as there would be less depleted solution of lower hexamethylene tetramine around the smaller area.

As illustrations of the practice of this invention, the folowing examples are given.

*Example 1.*—After the cooling system has been treated with oxalic acid solution and flushed with water, the water is drained; the drainage cocks closed, and a solution of 37% by weight sodium silicate is added, such that the ratio of silica to sodium oxide by weight is 3.0. The quantity of sodium silicate solution used is such as to give a final concentration in the cooling system of 0.18% sodium silicate by weight. Water is then added and the engine is idled as soon as sufficient water is added to make circulation possible (usually half full). The rest of the water is added to fill the cooling system, while the engine is still idling. The engine is circulated for about ½ minute after the cooling system is full. The temperature of the cooling system remains at approximately ambient temperature. The sodium-silicate water solution is drained, the drainage cocks closed, and the cooling system is filled with water. Sodium tetraborate is added in such quantity as to correspond to 0.60 gram anhydrous content per each 100 milliliters of coolant, and 0.04 gram of hexamethylene tetramine per each 100 milliliters of coolant are added.

*Example 2.*—Example 1, in which the acid cleaner is sodium bisulphate.

*Example 3.*—Example 1, in which the acid cleaner is oxalic acid plus aluminum chloride.

*Example 4.*—Example 1, in which the acid cleaner is sodium bisulphate plus oxalic acid.

*Example 5.*—Examples 1, 2, 3, 4, in which 40% by weight sodium silicate solution is added.

*Example 6.*—Examples 1, 2, 3, 4, or 5, in which the silicate solution is diluted with 1 part of water prior to addition to the cooling system.

*Example 7.*—Example 6, the silicate solution being diluted with 2 parts of water prior to addition to the cooling system.

*Example 8.*—Example 6 or 7, in which 0.36 gram sodium silicate per each hundred milliliters of coolant of the total cooling system is used.

*Example 9.*—Example 8 in which 0.76 gram sodium silicate per each hundred milliliters of coolant of the total cooling system is used.

*Example 10.*—Example 8 in which 1 gram sodium silicate per each hundred milliliters of coolant of the total cooling system is used.

*Example 11.*—Example 8 in which 1.2 grams sodium silicate per each hundred milliliters of coolant of the total cooling system is used.

*Example 12.*—Example 8 in which 1.6 grams sodium silicate per each hundred milliliters of coolant of the total cooling system is used.

*Example 13.*—Examples 8, 9, 10, 11, 12 in which the ratio by weight of silica to sodium oxide of the sodium silicate is 3.2.

*Example 14.*—Example 13, in which the ratio by weight of silica to sodium oxide of the sodium silicate used is 3.5.

*Example 15.*—Example 13, in which the ratio by weight of silica to sodium oxide of the sodium silicate used is 3.75.

*Example 16.*—Example 13, in which the ratio by weight of silica to sodium oxide of the sodium silicate used is 4.0.

*Example 17.*—Examples 13, 14, 15 or 16, in which the circulation time is five minutes after the cooling system is filled subsequent to addition of sodium silicate.

*Example 18.*—Example 17, in which the circulation time is 15 minutes.

*Example 19.*—Example 17, in which the circulation time is 30 minutes.

*Example 20.*—Example 17, except that the circulation time is 1 hour.

*Example 21.*—Example 17, except that the circulation time is 2 hours.

*Example 22.*—Example 17, except that the circulation time is 3 hours.

*Example 23.*—Example 17, except that the circulation time is 4 hours.

*Example 24.*—Examples 17, 18, 19, 20, 21, 22, 23 except that the circulation of the cooling system is at 100° F. to 120° F.

*Example 25.*—Example 24, except that the circulation of the cooling system is at 140° F.–150° F.

*Example 26.*—Example 24, except that the circulation of the cooling system is at 160° F.–170° F.

*Example 27.*—Example 24, except that the circulation of the cooling system is at 180° F.–190° F.

*Example 28.*—Examples 24, 25, 26, 27 in which the cooling system is filled with a glycol-water antifreeze after draining the silicate solution.

*Example 29.*—Example 28, except that the cooling system is filled with alcohol-water type antifreeze after draining the silicate solution.

*Example 30.*—Examples 24, 25, 26 or 27 except that the cooling system is filled with water after draining the silicate solution.

*Example 31.*—Example 28, 29 or 30 in which sodium tetraborate that corresponds to an anhydrous content of 1.2 grams per 100 milliliters of coolant and 0.04 gram hexamethylene tetramine per each 100 milliliters of coolant is used.

*Example 32.*—Example 31, in which 0.1 gram hexamethylene tetramine per each 100 milliliters of coolant is used.

*Example 33.*—Example 31, in which 0.2 gram hexamethylene tetramine per each 100 milliliters of coolant is used.

*Example 34.*—Example 31, in which 0.4 gram hexamethylene tetramine per each 100 milliliters of coolant is used.

*Example 34a.*—Example 31, in which 0.6 gram hexamethylene tetramine per each 100 milliliters of coolant is used.

*Example 35.*—Example 31, in which 0.8 gram hexamethylene tetramine per each 100 milliliters of coolant is used.

*Example 36.*—Examples 32, 33, 34, 34a, 35 in which sodium tetraborate that corresponds to an anhydrous content of 1.5 grams per each 100 milliliters of coolant is used.

*Example 37.*—Example 36 in which sodium tetraborate that corresponds to an anhydrous content of 2.0 grams per each 100 milliters of coolant is used.

In the foregoing description we have disclosed preferred embodiments of the invention. However, it is not intended that this invention be limited by the specific examples set forth above and it will be apparent to those skilled in the art that the proportions of the ingredients may be varied considerably without departing from the spirit of the invention.

We claim:

1. The process of inhibiting corrosion in an acid cleaned cooling system comprising the steps of circulating through said system a sodium silicate solution of a concentration between approximately 0.18 to 1.6% by weight, draining said solution, adding a cooling medium to said system and adding sodium tetraborate and hexamethylene tetramine in such quantity as to correspond to approximately 0.6 to 2 grams anhydrous content of sodium tetraborate and approximately 0.04 to 0.8 gram of hexamethylene tetramine per 100 milliliters of cooling medium to said cooling medium.

2. The process according to claim 1 in which the sodium silicate has a ratio of silica to sodium oxide by weight of not less than approximately 3 nor more than approximately 4.

3. The process according to claim 1 in which the cooling medium is water and said sodium tetraborate is added in such quantity to correspond to approximately 0.8 gram anhydrous content per 100 milliliters of water.

4. The process according to claim 1 in which the cooling medium is alcohol-water type antifreeze and said sodium tetraborate is added in such quantity to correspond to approximately 1.2 grams anhydrous content per 100 milliliters of cooling medium.

5. The process according to claim 1 in which the cooling medium is glycol-water type antifreeze and said sodium tetraborate is added in such quantity to correspond to approximately 1.3 grams anhydrous content per 100 milliliters of cooling medium.

6. The process of inhibiting corrosion in an acid cleaned cooling system comprising the steps of adding a solution of approximately 37–40% by weight of sodium silicate in such quantity as to give a final concentration in the cooling system of approximately 0.18 to 1.6% sodium silicate by weight, adding water to fill said cooling system, circulating the solution in the system, draining the system, adding a cooling medium to said system and adding sodium tetraborate and hexamethylene tetramine in such quantity as to correspond to approximately 0.6 to 2 grams anhydrous content of sodium tetraborate and approximately 0.04 to 0.8 gram of hexamethylene tetramine per each 100 milliliters of cooling medium.

7. The process according to claim 6 in which said sodium silicate has a ratio of silica to sodium oxide by weight of not less than approximately 3 nor more than approximately 4.

8. The process according to claim 7 in which the cooling medium is water and said sodium tetraborate is added in such quantity to correspond to approximately 0.8 gram anhydrous content per 100 milliliters of water.

9. The process according to claim 7 in which the cooling medium is alcohol-water type antifreeze and said sodium tetraborate is added in such quantity to correspond to approximately 1.2 grams anhydrous content per 100 milliliters of cooling medium.

10. The process according to claim 7 in which the cooling medium is glycol-water type antifreeze and said sodium tetraborate is added in such quantity to correspond to approximately 1.3 grams anhydrous content per 100 milliliters of cooling medium.

References Cited in the file of this patent

UNITED STATES PATENTS 2,060,138     Taylor _____ Nov. 10, 1936

FOREIGN PATENTS 1,048,440     Germany _____ Jan. 8, 1959